US012762632B2

(12) United States Patent
Srinivasan et al.

(10) Patent No.: US 12,762,632 B2
(45) Date of Patent: Oct. 13, 2026

(54) VIRTUAL ZONING REVIEW

(71) Applicant: University of Florida Research Foundation, Inc., Gainesville, FL (US)

(72) Inventors: Ravi Shankar Srinivasan, Gainesville, FL (US); Nawari O. Nawari, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 272 days.

(21) Appl. No.: 17/848,943

(22) Filed: Jun. 24, 2022

(65) Prior Publication Data

US 2023/0196486 A1 Jun. 22, 2023

Related U.S. Application Data

(60) Provisional application No. 63/292,113, filed on Dec. 21, 2021.

(51) Int. Cl.
*G06Q 50/16* (2024.01)
*G06Q 30/018* (2023.01)

(52) U.S. Cl.
CPC ......... *G06Q 50/165* (2013.01); *G06Q 30/018* (2013.01)

(58) Field of Classification Search
CPC ............... G06Q 50/165; G06Q 30/018; G06Q 10/06313; G06F 30/20
See application file for complete search history.

(56) References Cited

U.S. PATENT DOCUMENTS

2008/0059220 A1* 3/2008 Roth ...................... G06Q 50/18 705/317
2019/0347751 A1* 11/2019 Gupta .................... G06Q 10/10
(Continued)

OTHER PUBLICATIONS

Khan et al. "Geotechnical Property Modeling and Construction Safety Zoning Based on GIS and BIM Integration" Appl. Sci. Apr. 28, 2021, 11(9), 4004; https://doi.org/10.3390/app11094004; (Year: 2021).*
(Continued)

*Primary Examiner* — Wenren Chen
(74) *Attorney, Agent, or Firm* — Thomas | Horstemeyer, LLP

(57) ABSTRACT

The present disclosure presents a system and related methods for automated determination of land development code performance. One such method comprises performing, using at least one hardware processor, design model validation, wherein design model validation comprises entering land development permit application file information and checking the land development permit application file information against relevant land development codes; performing exchange model code checking using a plurality of exchange models; performing conformance checking by receiving a request from the exchange models and passing the land development permit application file information to design checking modules configured to check land development code, ordinance, and regulation provisions and one or more codes, ordinances, and regulations per local, state, national or international requirements; and performing compliance reporting based on input provided from the design checking modules.

20 Claims, 15 Drawing Sheets

(56) References Cited

U.S. PATENT DOCUMENTS

| | | | | |
|---|---|---|---|---|
| 2020/0258174 | A1* | 8/2020 | Rodriguez | G06Q 50/163 |
| 2022/0107977 | A1* | 4/2022 | Marthouse | G06N 3/08 |

OTHER PUBLICATIONS

Hajji et al. "Development of an Integrated BIM-3D GIS Approach for 3D Cadastre in Morocco" ISPRS Int. J. Geo-Inf. 2021, 10(5), 351; https://doi.org/10.3390/ijgi10050351 (Year: 2021).*

Nawari, "A Generalized Adaptive Framework for Automating Design Review Process: Technical Principles" 2019, In: Mutis, I., Hartmann, T. (eds) Advances in Informatics and Computing in Civil and Construction Engineering. Springer, Cham. https://doi.org/10.1007/978-3-030-00220-6_48 (Year: 2019).*

International Search Report and Written Opinion mailed on Mar. 24, 2023 for PCT Patent Application No. PCT/US2022/081686.

Nawari O. Nawari "A Generalized Adaptive Framework (GAF) for Automating Code Compliance Checking" Buildings 9.4 (2019): 86.

* cited by examiner

SECTION R304
MINIMUM ROOM AREAS

R304.1 Minimum area.

Habitable rooms shall have a floor area of not less than 70 square feet (6.5 $m^2$).

Exception: Kitchens.

R304.2 Minimum dimensions.

Habitable rooms shall be not less than 7 feet (2134 mm) in any horizontal dimension.

Exception: Kitchens.

R304.3 Height effect on room area.

Portions of a room with a sloping ceiling measuring less than 5 feet (1524 mm) or a furred ceiling measuring less than 7 feet (2134 mm) from the finished floor to the finished ceiling shall not be considered as contributing to the minimum required habitable area for that room.

FIG. 5

Real time Code Checking Wheel

Dear ROB,

Thank you for allowing Virtual Review Assist to be of service to you. After reviewing the permit application, your application has been flagged by zoning and the following will need to be addressed prior to your final submission:

1. EXISTING FUTURE LAND USE DESIGNATION:

2. PROPOSED ZONING:
   Proposed zoning must be listed in relation to the guidelines that correlate to the site development plan. Please provide the proposed zoning/land use for the folio you provided.

Municode: 2.01.02 https://library.municode.com/fl/hillsborough_county/codes/land_development_code?nodeId=ARTIIZODI_PT2.01.00STZODI_S2.01.02ESZODI 3. MAXIMUM DEVELOPMENT POTENTIAL PER COMP PLAN:
   Hillsborough County permits 12 dwelling units per acre, your site exceeds the allotted units permitted. Please revise and resubmit. The allotted Single Family dwelling units per acre in PD District is 12 units per acres.

Municode: 5.03.05
   https://library.municode.com/fl/hillsborough_county/codes/land_development_code?nodeId=ARTVDEOP_PT5.03.05GESIPLIN&wdLOR=cFBoFB889-F9B2-4143-A617-oo81F3477694

4. PROPOSED RESIDENTIAL TYPE:
   Please state the proposed residential site using one of the following district abbreviations. Your entry was either absent or invalid.

Municode: 2.01.02
   https://library.municode.com/fl/hillsborough_county/codes/land_development_code?nodeId=ARTIIZODI_PT2.01.00STZODI_S2.01.02ESZODI 5. PROPOSED MAXIMUM NUMBER OF UNITS:
   Hillsborough County permits 12 dwelling units per acre, your site exceeds the allotted units permitted. Please revise and resubmit. The allotted Single Family dwelling units per acre in PD District is 12 units per acres.

Municode: 5.03.05
   https://library.municode.com/fl/hillsborough_county/codes/land_development_code?nodeId=ARTVDEOP_PT5.03.05GESIPLIN&wdLOR=cFBoFB898-F9B2-4143-A617-ooB1F3477694

6. MINIMUM LOT SIZE:

7. MINIMUM LOT WIDTH:

FIG. 10A-1

The lot development standard that you have provided has not met the minimum width requirement. Please adjust according to Hillsborough County's Land Development Code and resubmit.

Municode: 5.08.07
https://library.municode.com/fl/hillsborough_county/codes/land_development_code?nodeId=ARTVDEOP_PT5.08.00MIEINTNCO_S5.08.07LOBUST

8. MAXIMUM BUILDING HEIGHT:

The maximum building height standard that you have provided has exceeded the maximum building height allotted. Please adjust according to Hillsborough County's Land Development Code and resubmit.

Municode: 5.08.07 https://library.municode.com/fl/hillsborough_county/codes/land_development_code?nodeId=ARTVDEOP_PT5.08.00MIEINTNCO_S5.08.07LOBUST

9. MAXIMUM LOT COVERAGE:

The lot coverage that you have provided exceeds the maximum lot coverage allotted per proposed zoning district. Please review the Hillsborough County Land Development Code and revise.

Municode: 6.01.01 https://library.municode.com/fl/hillsborough_county/codes/land_development_code?nodeId=ARTVIDESTIMRE_PT6.01.01SCDIARHEBUPRE

10. BUFFERS AND SCREENING:

Buffers must comply with the Hillsborough County Land Development Code in the Land Use Classification of Proposed and Existing Uses with the Zoning of Adjacent Vacant Properties. Please specify, "Yes" or "No", if it does or does not reflect your site plan.

Municode: 6.06.06 https://library.municode.com/fl/hillsborough_county/codes/land_development_code?nodeId=ARTVIDESTIMRE_PT6.06.00LAIRBURE_S6.06.06BUSCRE If you have any questions, do not hesitate to contact our zoning staff to assist you. We will help guide in zoning review and look forward to pushing this project forward.

Sincerely,

Virtual Review Assist.

FIG. 10A-2

Dear ROB,

Thank you for allowing Virtual Review Assist to be of service to you. After reviewing your permit application, your application has been flagged by zoning and the following will need to be addressed prior to your final submission:

1. CROSS ACCESS POINTS BETWEEN ADJACENT PROPERTIES:
For Planned Development districts you must meet the following requirements...Cross-Access Criteria and requirements must show one roadway with Access Management Classification 1-6, access to frontage roadway with pedestrian cross access demonstrated. Design must also demonstrate the cross-access is feasible and desirable. Request for relief from compliance must be reviewed in coordination with LDC Section 5.03.06 variations for site design. Please fill in your row in your attribute table with "Cross Access Points Between Adjacent Properties", add "As Shown" to demonstrate you understand this must be included in your site design process.
Municode: 5.03.05
https://library.municode.com/fl/hillsborough_county/codes/land_development_code?nodeId=ARTVDEOP_PT5.03.00PLDEDI_S5.03.05GESIPLIN&wdLOR=cE1F4DAC3-517E-48B2-838o-0E9B8D86806A

2. ROW DEDICATION REQUIRED TO COUNTY:
The ROW Dedication must have a specific property survey of the property and a detailed transportation analysis.
Municode: 6.2.1
https://library.municode.com/fl/hillsborough_county/codes/development_procedures?nodeId=S6.0PRAMT0ZOAT_S6.2.1PLDEDIRE&wdLOR=cED164F23-6132-453B-8497-62CE389D41F6

3. LOCATION OF TRAFFIC CONTROL DEVICES:
Define the location of where traffic control devises will be added and why they are needed. Please write "As Shown" in your transportation information, "Location of Traffic Control", to demonstrate you understand this must be included in your site design process.
Municode: 6.2.1
https://library.municode.com/fl/hillsborough_county/codes/development_procedures?nodeId=S6.0PRAMT0ZOAT_S6.2.1PLDEDIRE If you have any questions do not hesitate to contact our zoning staff to assist you. We will help guide you in zoning review and look forward to pushing this project forward.

Sincerely,
Virtual Review Assist.

FIG. 10B

Dear ROB,

Thank you for allowing Virtual Review Assist to be of service to you. After reviewing your permit application, your application has been flagged by zoning and the following will need to be addressed prior to your final submission:

1. URBAN SERVICE AREA:
Platting shall be required for all residential subdivisions and must be in conformance with Chapter 177, FS.
Municode: 4.1.4.1.2.1.1
https://library.municode.com/fl/hillsborough_county/codes/development_procedures?nodeId=S4.0PRISDEPEADRE_S4.1.4.1.2.1.1MISU

2. ALL ROW ONSITE & WITHIN 150':
The amounts of ROW to be, "dedicated and/or reserved by the project" Must be shown and meet the requirements of the Hillsborough County Transportation Manual.
Municode: 6.2.1
https://library.municode.com/fl/hillsborough_county/codes/development_procedures?nodeId=S6.0PRAMToZOAT_S6.2.1PLDEDIRE

3. EXISTING LAND USE:
This is your district overlay, every area in Hillsborough County is zoned for a certain land use. You can find the current land use by turning on the Hillsborough County Map Viewer at https://maps.hillsboroughcounty.org/MapHillsborough/MapHillsborough.html. Here you will need to make sure the zoning layer is turned on with: DSD_Viewer_Zoning_Regulatory. If this layer is on you can search the parcels address and find the zoning for that specific parcel, please include this in the General Notes Section of your Site Plan
Municode: 2.01.02
https://library.municode.com/fl/hillsborough_county/codes/land_development_code?nodeId=ARTIIZODI_PT2.01.00STZODI_S2.01.02ESZODI

4. EXISTING STRUCTURES:
If there are current existing structures on the site they need to be shown on the survey. This is a courtesy notice that if the development plan does not have a site survey showing the existing structures you will have to resubmit.
Municode: 4.1.4.1.1
https://library.municode.com/fl/hillsborough_county/codes/development_procedures?nodeId=S4.0PRISDEPEADRE_S4.1.4.1.1CEPA If you have any questions do not hesitate to contact our zoning staff to assist you. We will help guide you in zoning review and look forward to pushing this project forward.

Sincerely,
Virtual Review Assist.

FIG. 10C

VIRTUAL ZONING REVIEW

CROSS-REFERENCE TO RELATED APPLICATION

This application claims priority to co-pending U.S. provisional application entitled, "Virtual Zoning Review," having Ser. No. 63/292,113, filed Dec. 21, 2021, which is entirely incorporated herein by reference.

BACKGROUND

Generally, one needs to obtain a land development permit from a local government office before one can develop or modify a piece of property, such as modifying zoning regulations for the property or modification to how the property can be developed. To apply, one can submit a permit application package to a local government office that oversees the jurisdiction. After the application is submitted, the government office will manually review the application and depending on the nature of the project, the review could involve several government departments that are required to enforce numerous Federal, State, and local land development regulations. As such, the review process generally takes several months.

If the application cannot be approved as submitted, then lists of necessary corrections from all the departments that reviewed the application is generally provided so that a revised or updated application can be provided. When the revised permit application is submitted, the application will be distributed to the departments that generated the initial corrections for subsequent manual review. After the local government office determines that the application satisfies all pertinent land development requirements, the application is approved and associated government fees are due to be paid. Upon payment, the applicable land development permit can be issued and development can begin. As such, the process of issuing a land development permit can be complex and slow.

BRIEF DESCRIPTION OF THE DRAWINGS

The details of the present disclosure, both as to its structure and operation, may be gleaned in part by study of the accompanying drawings, in which like reference numerals refer to like parts.

FIG. 5 shows an example of regulatory code provisions.

FIGS. 10A-1, 10A-2, 10B, and 10C show exemplary reports of application items that have been noted or flagged for not conforming with or violating applicable zone regulations in accordance with embodiments of the present disclosure.

DETAILED DESCRIPTION

In an embodiment, systems, methods, and non-transitory computer-readable media are disclosed for automated determination of land development code performance, such as but not limited to automated site development-related zoning reviews conducted by counties and cities.

After reading this description, it will become apparent to one skilled in the art how to implement the various alternative embodiments and alternative applications described herein. However, although various embodiments are described herein, it is understood that these embodiments are presented by way of example and illustration only, and not limitation. As such, this detailed description of various embodiments should not be construed to limit the scope or breadth of the appended claims.

Figure 1:
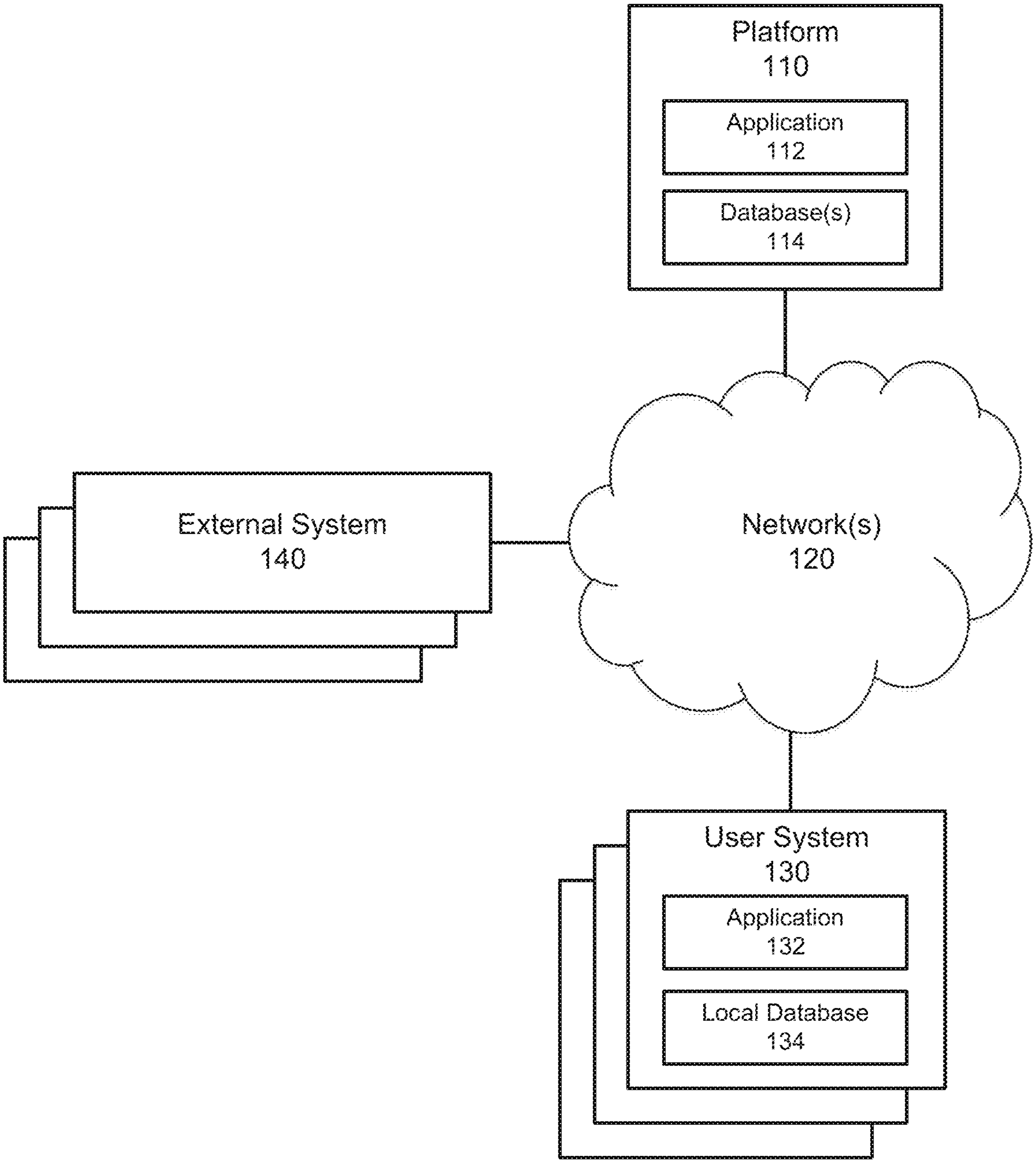
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be co-located and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions of the application described herein.

Figure 2:
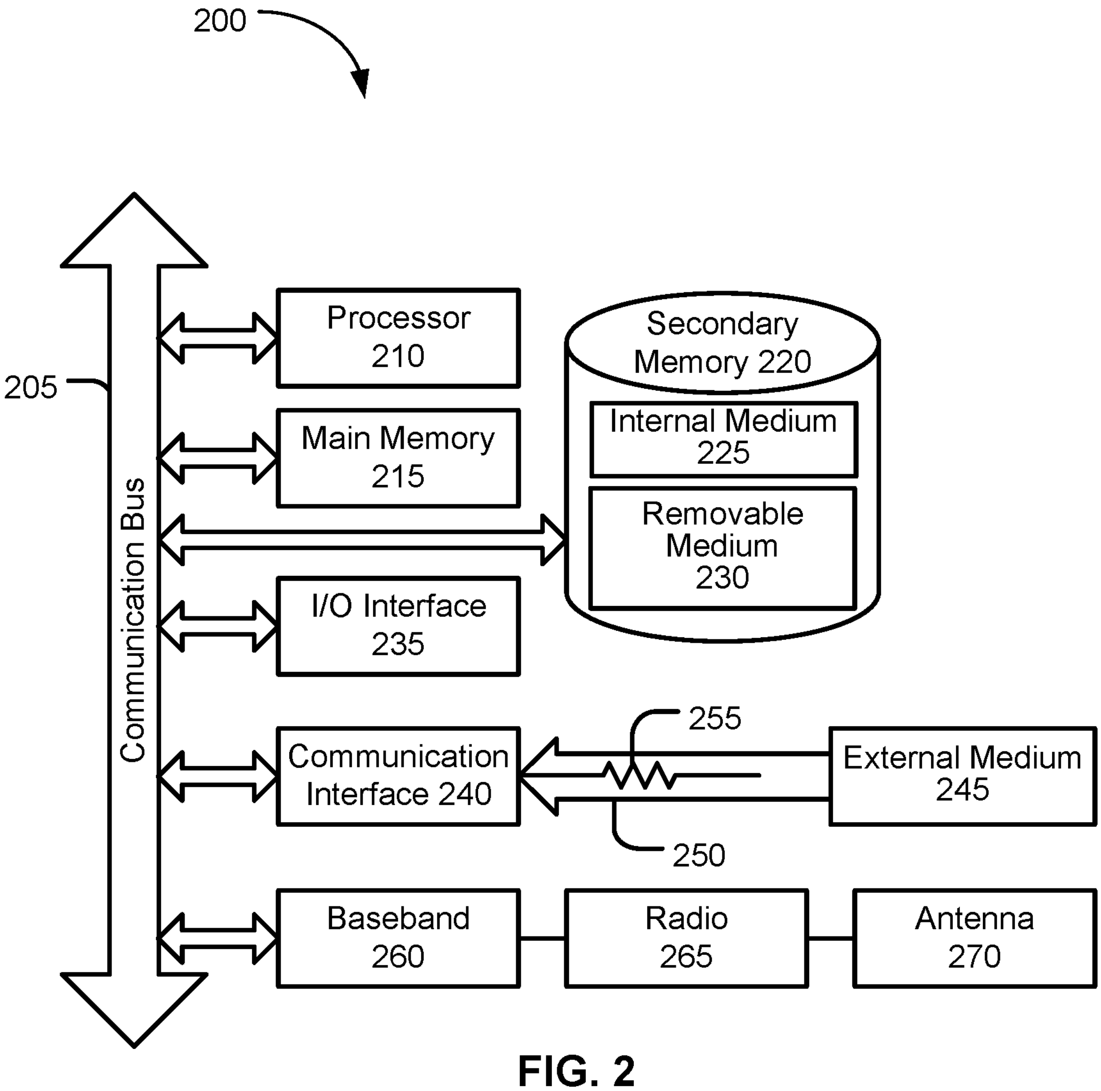
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C, C#, C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

Embodiments of processes for automated determination of land development code performance will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the claims included herein. In addition, the grouping of functions within a component, block, module, circuit, or step is for ease of description. Specific functions or steps can be moved from one component, block, module, circuit, or step to another.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

As discussed, land development permit review is the process of evaluating a proposed land development plan against applicable codes, ordinances and regulations for compliance and also identify issues before development takes place. Typically, counties and/or cities of the United States have one or more departments established to oversee land development and use, where one can submit land development documents, such as an application for a land development permit, which can include rezoning permits and/or permits approving site development plans.

For a conventional Design Review Process (DRP), professionals (such as architects, engineers, contractors, etc.) can be consulted to prepare documents related to a permit application for a land development project. Accordingly, the application can be submitted to the applicable government authority to be reviewed, revised if necessary, and approved to result in issuance of a land development permit before development can commence on a piece of property.

Accordingly, the appropriate government authority or department will manually review the land development documents to determine if they comply with the appropriate code, ordinances and regulations. The land development documents can often be submitted as PDF (Portable Document Format) forms (e.g., the site plan drawings transportation, irrigation, civil/site, utilities and site infrastructure, landscape, etc., using a computer-aided design (CAD) program), but the review of the forms has not changed significantly from when hardcopies forms were submitted in prior years.

Thus, the manual design review process (DRP) is time-consuming, error-prone, subjective, and becoming very costly to sustain. Reasons behind these issues include: (a) increase rate of updates of regulations and standards with new knowledge and research outcomes; (b) new, state of the art technologies, equipment, and devices; and (c) a higher amount of data and its multidisciplinary nature (Nawari, 2012a; Nawari and Alsaffar, 2017 and 2017;). Moreover, for site plans, other issues associated with the manual DRP are lack of consistency in interpretation of codes, ordinances and/or regulatory provisions, the ability to properly self-check required aspects, and the long time needed for approvals of land development permits by government authorities that can have adverse financial impacts on projects submitted for authorization. Additionally, applicable land development (e.g. zoning) codes, ordinances and regulations are legal documents written and authorized by people to be understood and applied by professionals. As such, land development codes, ordinances and regulations are not precise as formal logic. Thus, the automation of a Design Review Process (DRP) is a challenge.

In accordance with embodiments of the present disclosure, exemplary systems and methods for automated determination of land development code performance are provided to facilitate automation of the Design Review Process. The systems and methods described use a new system for a standard computable representation of land development codes that are compatible with open data standard. Previously existing approaches for automated rules compliance verification in land development site plans are either based on proprietary frameworks, domain-specific areas, or hard-coded rule-based expressions. While these approaches may be useful in their specific implementations, they have the disadvantages of being costly to sustain, difficult to modify, and the absence of a generalized framework of rules and regulations modeling that can adjust to different domains—thus, they are not compatible with an open data standard. Furthermore, the existing approaches do not have the means to deal with subjective and ambiguous land development regulations, and they have not endured the test of industry applications.

An exemplary method for automated determination of land development code, ordinances and regulatory checking can automate a land development permit process by having Applicants upload their land development permit application file, e.g., as represented in a Building Information Model (BIM) or CAD or PDF data, to a platform, such as platform 110, which can be configured to compare the information contained in the uploaded file to the state/local codes and regulations. The results of the comparison, and any issue flagged can then be presented as output, e.g., to user system 130. Further, the comparison results can be used to preliminarily approve the permit, e.g., the results will have to be briefly reviewed by a government staff. In fact, the BIM, CAD or PDF files and/or the results can be sent to the government authority, which can be one of the external systems 140.

In order to perform the comparison, the codes and regulations must undergo an interpretation process where the semantic structure of each regulation is translated into object rules or parametric models, using certain formal languages, and associated with the land development permit application file data being examined. This data can then be compared to the rules and models, or stated another way the rules and model can be applied to the data, and deficiencies noted. In an non-limiting example, the BIM or CAD model or PDF document defines objects as parameters and relations to other objects and carrying object attributes that specify pertinent details about the objects. For example, the BIM or CAD or PDF data can include spatial relationships of the land development design, quantities and properties, and a wide range of land development details including details on zoning, landscaping, drainage, sanitation, wetland controls, etc. that can be checked against applicable codes, ordinances and regulations. Automated determination of land development code, ordinances and regulatory checking can include a variety of regulations, such as site zoning & development, utilities, infrastructure, etc.

In accordance with various embodiments of the present disclosure, an exemplary framework for automated determination of land development code, ordinances and regulatory checking has at least two main phases. The first phase develops the theoretical background for transforming the written provisions and guidelines of applicable land development codes and regulations into a computable representation. Accordingly, the first phase involves an interpretation process where the semantic structure of each regulation is translated into object rules or parametric models using certain formal languages. The first phase can be implemented on platform 110, and/or on another platform such as external system 140 and uploaded or transferred to platform 110.

The second phase specifies the various components required for the computerization of the code, ordinances and regulatory checking process. Additional phases are focused on developing code for the data exchanges between the elements of the framework to perform the computerized evaluation process of land development plans to achieve compliance.

Figure 3:
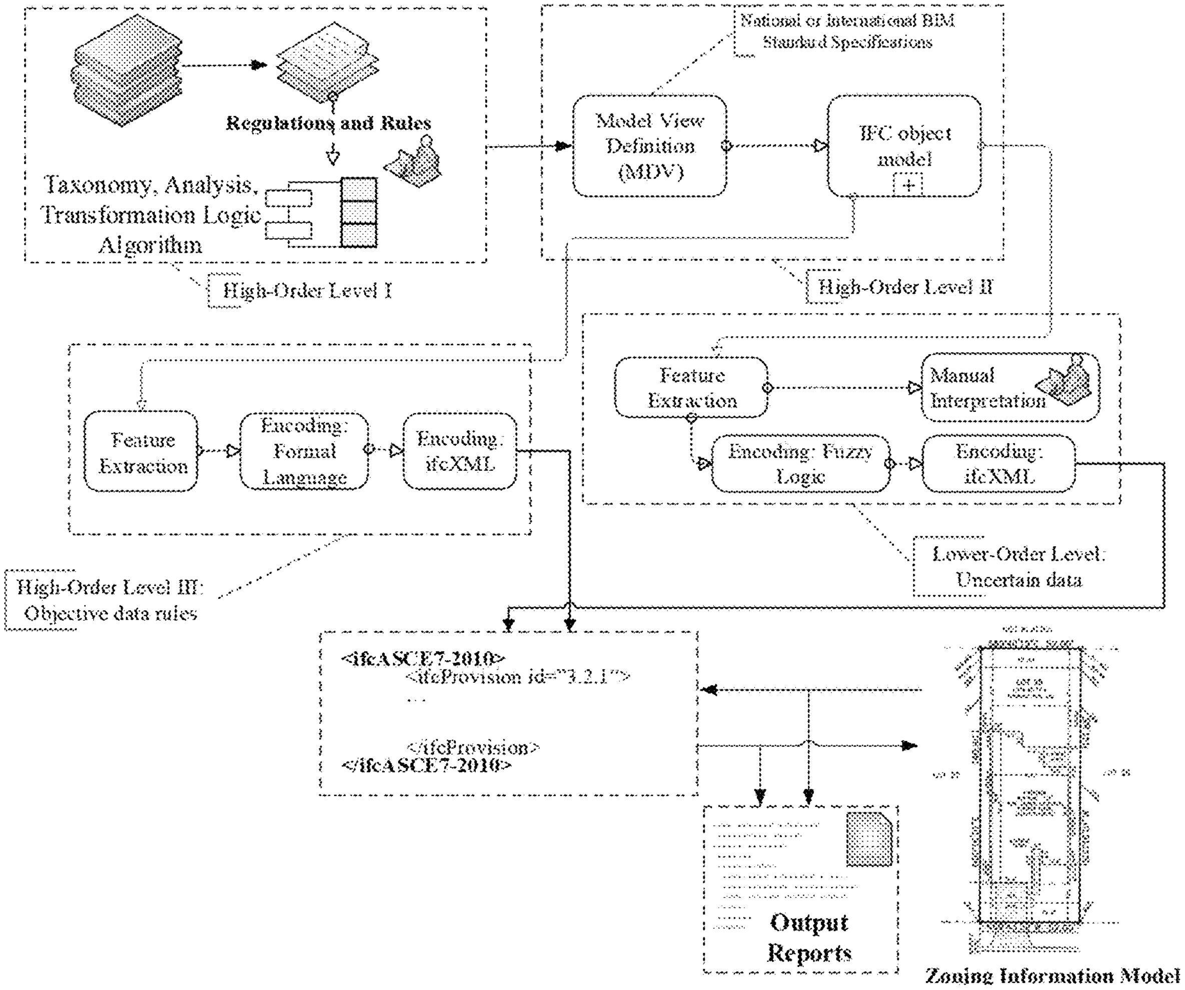
FIG. 3 shows an exemplary generalized adaptive framework for automated determination of land development code performance in accordance with various embodiments of the present disclosure.

In particular, the second phase centers on development levels for the computable code. In various embodiments, the development levels include:

(i) High-Order Level I: Classification of regulatory text into four main categories: conditional; content; ambiguous; and dependent;
(ii) High-Order Level II: Requires the Development of Model View Definition (MVD), leading to IFC (Industrial Foundation Classes) schema;
(iii) Higher-order level III: Requires feature extraction of all specific objective data leading to full encoding of object rules/models; and
(iv) Lower-order level: Necessitates feature extraction of uncertain data, then employing partial encoding using fuzzy logic and approximate reasoning methods as well as neural Natural Language Processing (NLP) techniques, deep neural network-style machine learning/Artificial Intelligence, as represented in an exemplary Generalized Adaptive Framework (GAF) for Automated Review of FIG. 3.

Figure 4:
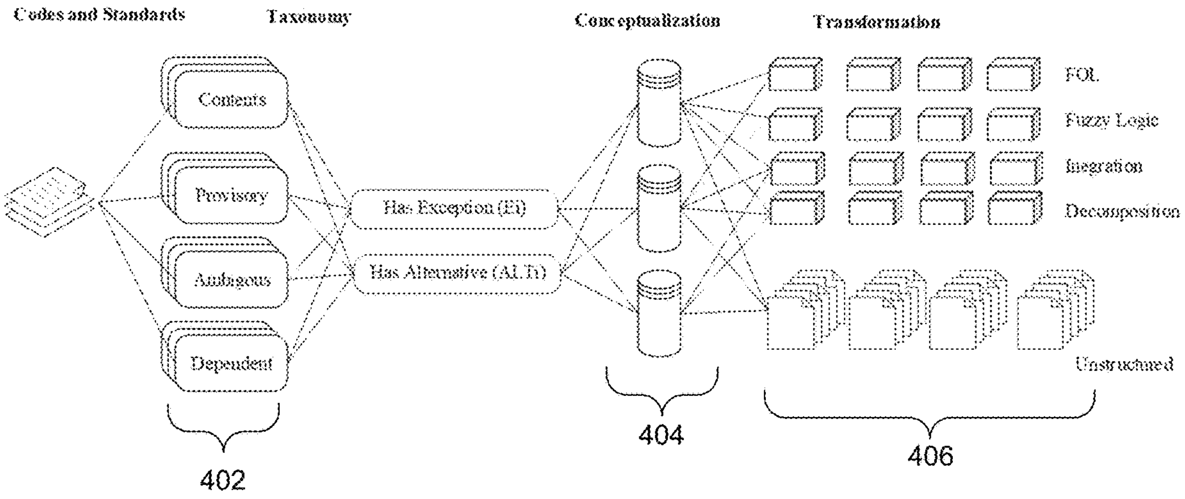
FIG. 4 shows an overview of the Transformation Logic Algorithm (TLA) in accordance with various embodiments of the present disclosure.

High-Order Level I involves taxonomy formation, data analysis including partitioning and classification of regulatory text into broad categories (e.g. content; conditional or provisory; ambiguous; dependent), and the development of Transformation Logic Algorithm (TLA). Accordingly, FIG. 4 shows an overview of the high-order level I phase. A first stage of the process of FIG. 4 involves the classification, in step 402, of land development codes and standards into a taxonomy category. In the example of FIG. 4, there are 4 categories: concepts, provisory, ambiguous, and dependent. The taxonomy categories can then be conceptualized in step 404, and transformed into a logical rule based on the selected category in step 406. An exemplary system uses neural NLP techniques and/or deep neural network-style machine learning/Artificial Intelligence.

The TLA is based partially on first-order logic calculus. For example, an exemplary code provision that says, "only Professional Engineer (PE) must approve structural design" can be stated as following using TLA:

$$\text{Prov (PE)} \in \text{Conditional}; \forall x\ (\text{PE}(x) \rightarrow \text{Permitted}\ (x, \text{approve design}))\ \forall x\ (\neg \text{PE}(x)\ \forall x\ \neg \text{Permitted}\ (x, \text{approve design})).$$

Additional illustrative TLA examples (Nawari, 2012) are shown below:

(i) An object is a member of a category: 4×8 S4S∈Wood Beams;

(ii) A category is a subclass of another category: Wood Beams⊂Beams (iii) All members of a category have some properties: x∈Wood Beams→Rectangular (x).

Members of a category can be recognized by some properties:

$$\text{DouglasFir}(x)\hat{}\text{Square}(x)\hat{}\text{Side}(x)=9.25''\hat{}x\in \text{Beams} \rightarrow x \in \text{Wood Beams}.$$

The syntax used in the above statements has similar definitions as in first-order logic calculus. The definitions of the syntax used are summarized in Table 1 (Syntax of Transformation Logic Algorithm (TLA)) (below).

TABLE 1

| SYMBOL | DEFINITION |
|---|---|
| :: = | Is defined as |
| ∧ | Conjunction |
| ∨ | Disjunction |
| ⊂ | Subset of |
| ¬ | Negation |
| ∀ | Universal Quantifier |
| ∃ | Existential Quantifier |
| ∈ | Belongs to |
| → | Implication |
| ↔ | Biconditional |
| ⇒ | Transform into |
| ::⇒ | Depends upon |
| Constant | String starting with an uppercase letter |
| Variable | String starting with a lowercase letter |
| Pred (arg1, arg2, . . . ) | Predicate |
| Fun (arg1, arg2, . . . ) | Function |
| Pred(arg1, arg2, . . . ) ^ Pred2(argl, arg2) ˇ . . . | Rule |

This TLA algorithm can be illustrated further by considering an exemplary and non-limiting Regulation Code—Residential 2020 (FBC 2020). FIG. 5 depicts parts of section 304 from the FBC 2020-Residential.

The provision shown in FIG. 5 can be transformed into computable representation using the TRA as follows:

Let $REG_i$="Section R304"; Where i varies from 1 to n number of code provisions. Then we have $$REG_i \in P_i \Rightarrow Y_i \Rightarrow X_i, \tag{1}$$

Where the subscript i stands for the counts of the code sections being processed and varies from 1 to n sections;

$P_i$ designates that this is a provisory clause, and describes the minimum room area ($Y_i$) which is given by $X_i$ that expresses the various Rules describing $Y_i$;

$$X_i=\{R_1, R_2, \ldots R_m\}, \tag{2}$$

Where $R_1, R_2, \ldots R_m$ are the rules defining $X_i$;

$$\text{Let } Z_{1j} = \{z_{11}\ \ldots\ z_{1q}\}; \tag{3}$$

$$z = \mathit{IfcSpace};\ z_{11} = \text{“}R\text{304.1”}; \tag{4}$$

$$\text{and } z_{12} ::= \text{Floor area} >= 70\ \text{ft}^2(6.5\ \text{m}^2);$$

$$R_2\text{: } \forall z(REG_i(z) \rightarrow \mathit{MinimumArea}(z, Z_{1j}) \wedge \neg\ \mathit{SpaceName}(z, \text{KITCHEN;}) \tag{5}$$

$$Z_{2j} = \{z_{21}\ \ldots\ z_{2q}\}; \tag{6}$$

Where $z_{21}$="R304.2"; and $z_{22}$:=least horizontal dimension of any habitable room >=7 ft (2.134 m);

$$R_3\text{: } \forall\ z\ (REG_i(z) \rightarrow \text{MinimumDimension}(z, Z_{2j})\ \hat{}\neg\text{SpaceName}(z, \text{KITCHEN}); \tag{7}$$

$$Z_{3j}=\{z_{31} \ldots z_{3q}\}; \tag{8}$$

Where $Z_{31}$="R304.3"; $z_{32}$:=Ceiling height>5 ft for sloped ceiling; and $z_{33}$:=Ceiling height >7 ft for furred ceiling;

$$R_4\text{: } \forall\ z\ (REG_i(z) \rightarrow \text{CeilingHeightLimitation}(z, Z_{3j}); \text{ and} \tag{9}$$

$$X_i=\{R_1\hat{}R_2\hat{}R_3\hat{}R_4\}. \tag{10}$$

Equation 10 then represents the knowledge transformation process to generate computable model for the code specifications expressed in FBC 2020-Residential, section R304. Thus, all of the rules and regulations can be similarly translated into equations using the TLA. Again, this can be done on platform 110 or the equations can be uploaded thereto, depending on the embodiment.

Conditional clauses, such as above can be transformed directly from the textual format into set of rules. Examples of these are very common and typical features include rules with specific values. An illustrative and non-limiting regulatory example is provided by provision (3.2.1) for computing lateral pressure in the ASCE 7-10 Standard for minimum design loads for buildings and other structure. Contents clauses cannot be translated into a TRUE or FALSE statement. Instead of advising, these clauses are usually used for definitions, such as the definition of firewall, fire rate, smoke evacuation, high-rise building, etc. Ambiguous clauses are the subjective provisions. They normally include words such as: approximately, about, relatively, close to, far from, maybe, etc. An example is the footnote of the design lateral soil pressure for the clause given in provision (3.2.1), ASCE 7-10: "For relatively rigid walls, as when braced by floors, the design lateral soil load shall be increased for sand and gravel type soils to 60 psf (9.43 kN/m2) per foot (meter) of depth. Basement walls extending not more than 8 ft (2.44 m) below grade and supporting light floor systems are not considered as being relatively rigid walls." Dependent clauses indicate that one clause is dependent upon one or more other clauses. They represent deep hierarchies and massive cross-referencing among provisions in code regulations. This means some provisions are only suitable for a particular condition when other clauses are met. These are often difficult to convert into sets of rules and may require manual verification for compliance.

Figure 6:
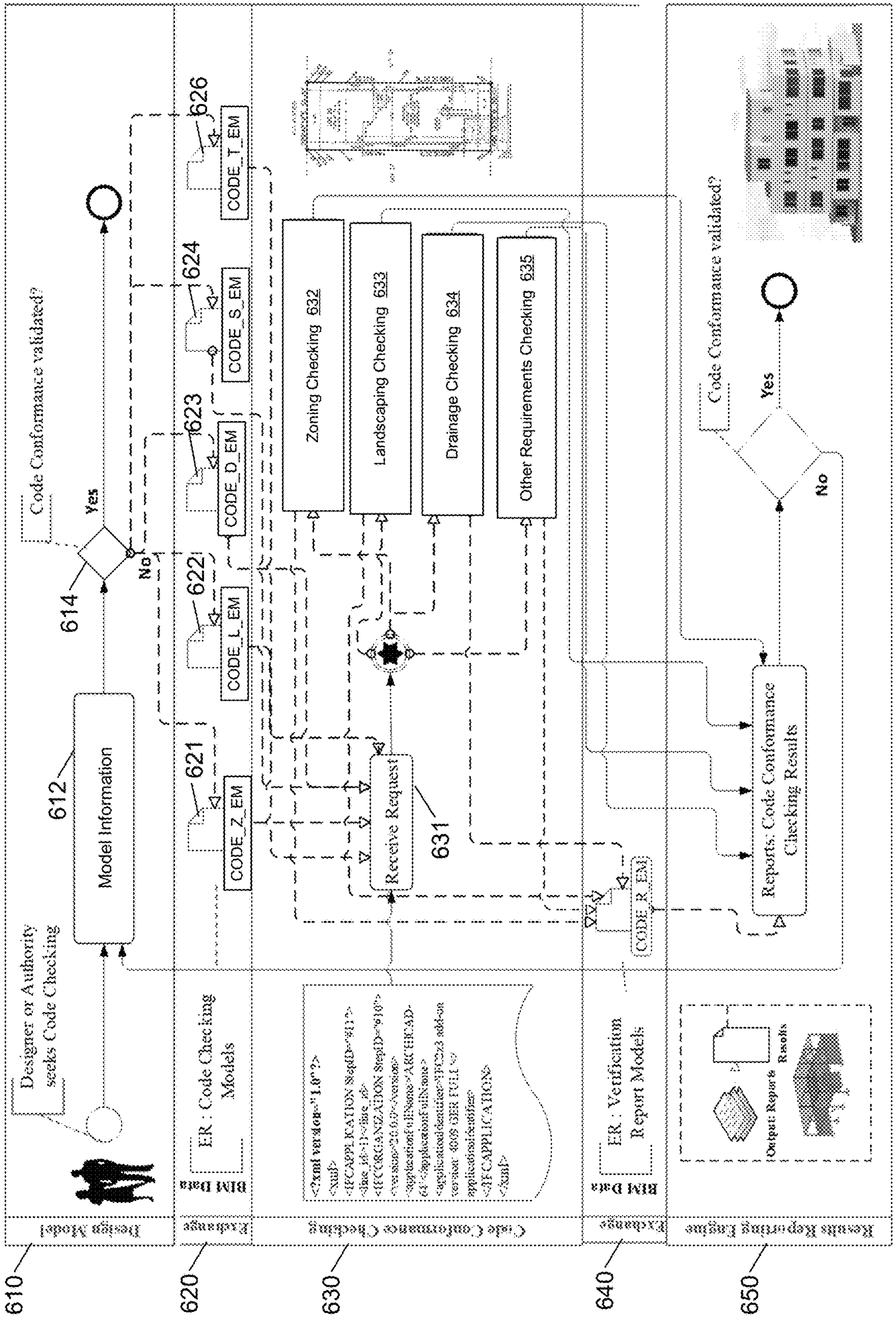
FIG. 6 shows an exemplary process for automated determination of land development code performance in accordance with various embodiments of the present disclosure.

Referring back to FIG. 3, the higher-Order Level II phase of the exemplary GAF centers on the development of IDM (Information Delivery Manual) and MVD (Model View Definitions) that allows the land development permit application file data to be compared to the relevant codes and regulations. The development of IDM for land development code specifications starts with a description of data exchange functional requirements and workflow situations for interactions between land development permit application file data (e.g., BIM model data) and the conditions specified in land development codes. This is demonstrated in the process map of FIG. 6. An exemplary system uses neural NLP techniques and/or deep neural network-style machine learning/Artificial Intelligence.

The process map is generated using a standard Business Process Modeling Notation (BPMN) as part of the IDM specifications (Nawari and Kuenstle, 2018) to define the MVDs and how to exchange data related to the MVDs. In the process map depicted in FIG. 6, the following tasks and processes are identified: Design model validation 610, exchange code checking 620, code conformance checking 630, verification reporting 640, and results reporting 650. The main tasks can have various sub-processes that can also be defined using process maps and IDMs.

For example, the design model validation 610 task comprises entering BIM model information in step 612, which is then checked against the relevant codes and regulations, using the taxonomy described above, for conformance in step 614. If the BIM model is validated in step 614, then such can be reported, in task 650. But if the code is not initially validated, then the process can move to the exchange code checking task 620. Task 620 can comprise several code checking models. The IDM employs notation for information exchanges between activities called Exchange Models (EM). Each exchange model is distinctively recognized across all use cases. The EMs can include, as non-limiting examples, CODE_Z_EM: Zoning Code Regulations case exchange model(s) (621); CODE_L_EM: Landscaping Code Regulations case exchange model(s) (622); CODE_D_EM: Drainage Code Regulations case exchange model(s) (623); CODE_S_EM: Sanitation Code Regulations case exchange models (624); CODE_T_EM: Transportation Code Regulations case exchange model(s) (625), etc.

The Code Conformance Checking task 630 can involve receiving a request from the exchange models (EMs) in step 631 and then passing the BIM or CAD or PDF data to the design checking modules, which can include the zoning checking module 632, landscaping checking module 633, Drainage checking module 634, and module 635 that can check for any other requirements, such as transportation, sanitation, etc. Outputs of the respective design checking modules can be supplied as inputs to a verification report model 640 for compiling such that this information can be supplied as input to a results reporting engine 650. The results reporting engine 650 can an output a report that is provided to a user system 130 and/or an external system 140. For example, the results or findings of the review (e.g., any issue flagged) can be presented as output, e.g., to user system 130. Further, the results can be used to preliminarily approve the permit, e.g., the results will have to be briefly reviewed by a government staff, and the results can be sent and reported to the government authority, which can be one of the external systems 140.

In each of these processes, the BIM or CAD or PDF requirements have to be established and stated according to the BIM or CAD or PDF standard procedure. In order to develop the IDM, the source regulation information needs to be classified. In one illustrative and non-limiting example, Florida Building Code (FBC 2020) is considered as the source example for an implementation of the exemplary framework, as illustrated in Table 2 (below). FBC is, typically, updated every 3 years.

TABLE 2

| Section | Classification | Concepts and Attributes | Dependencies |
|---|---|---|---|
| 18A-1 | Content (Cont) | Purpose and Intent, Identification | (Ord. No. 95-222, § 2, 12-5-95; Ord. No. 98-13, § 1, 1-13-98; Ord. No. 98-125, § 36, 9-3-98; Ord. No. 09-35, § 3, 5-5-09) |
| 18A-2 | Content (Cont) | Plans Required | |
| 18A-3 | Provisory (Prov) | Minimum Standards | Table A, Section 18A-6 (c) |
| 18A-4 | Provisory (Prov) | Native Species Percentages | (Ord. No. 95-222, § 2, 12-5-95; Ord. No. 97-90, § 1, 6-17-97; Ord. No. 98-13, § 1, 1-13-98; Ord. No. 09-35, § 4, 5-5-09) |
| 18A-5 | Provisory (Prov) | Landscape Plan Review Criteria | (Ord. No. 95-222, § 2, 12-5-95; Ord. No. 98-13) |
| 18A-6 | Dependent (Dep) | Landscape Manual | (Ord. No. 95-222, § 2, 12-5-95; Ord. No. 98-13, § 1, 1-13-98) |
| 18A-7 | Provisory (Prof) | Minimum Lot Requirements | |
| 18A-8 | Dependent (Dep) | Lot Requirements | |

The IFC schema encompasses a wide range of data objects. Thus, it is recommended that each discipline domain should only consider a subset of the full IFC schema to avoid processing an overwhelming amount of data. A Model View Definition (MVD) is developed as the tool for creating model subsets that are pertinent to the specific data exchange between domain application types. MVD diagram describes the concepts and attributes that will be used in the data exchange, as well as the schema and relationships between these concepts and attributes. In general, the exchange models are transformed from the IDM into various concepts. Each concept, in turn, is described with several attributes and relationships. The concluding phase is the translation of the MVD into implementation IFC entities, attributes, relationships and properties as required by the IFC schema.

The process of developing the MVDs counts on the description of the information exchange models (EMs) in the IDM and how they will be utilized, both with respect to domain users and software developers. From this information, the MVD is established for each attribute and describes how it is to be handled in the IFC schema. In essence, MVD offers the specification for IFC based data exchange implementation.

In various embodiments, a MVD can represent part of the exchanges for code checking and the land development plan. An exemplary MVD can provide the basis for developing MVD covering other parts of land development regulations and standards, which will enable high-quality IFC implementations that satisfy a design review process.

The development of the MVDs and EMs allows for certain objective aspects of the codes and regulations of the extracted and encoded in the High-order Level III phase. The Lower Order Level phase of an exemplary GAF framework introduces the method of transforming (step 506) ambiguous provisions into rules by applying an algorithm for partial transformation using first order logic (FOL), fuzzy logic, integration, decomposition, and approximate reasoning methods. Fuzzy logic offers ways of modeling linguistic rules in such a format that they can be integrated into a coherent logical schema (Nawari, 2019).

An illustrative and non-limiting example of vague design regulations can be found in Florida Building Code 2020-Residential (FBC 2020-R) section R322.1 In this provision, the regulations states:

> Buildings and structures constructed in whole or in part in flood hazard areas, including A or V Zones and Coastal A Zones, as established in Table R301.2(1), and substantial improvement and restoration of substantial damage of buildings and structures in flood hazard areas, shall be designed and constructed in accordance with the provisions contained in this section.

The word substantial is never defined precisely. Using an exemplary approach, then we have $REG_1$="Section R322.1"; then we have $REG_1 \in (C_1 \cap A_1)$ (11)

Where $REG_1$ is a variable for the regulation section, $(C_1 \hat{} A_1)$ designates that this is a content clause with ambiguous statements describing flood resistance construction. Now let $$REG_1=\{R_1, R_2, \ldots R_m\} \quad (12)$$

where, $R_1, R_2, \ldots R_m$ are the rules defining $REG_1$. Next let $Z_{1j}=\{z_{11}, \ldots, z_{1q}\}$; z=IfcBuilding; $z_{11}$="FBC 2020-R322";

$z_{12}$="ASCE 24". (13)

Now using logic notations, we have $R_1$: ∀z (InFloodZone(z)→(RequiredProvision(z, $z_{11}$))); (14)

$R_2$: ∀z (InFloodZone(z)→(RequiredProvision(z, $z_{12}$))). (15)

In terms of the conceptualization of the expression "substantial damage", fuzzy logic and predicates will be employed to translate the concepts into a computable model. A fuzzy set is defined as (Zadeh, 1965): A is a fuzzy subset of the universe of discourse U, is characterized by a membership function $\mu_A$: U→[0 . . . 1] which associates with each element u of U a number $\mu_A$ (u) in the interval [0,1]. This description can be utilized to express fuzzy predicate (Nawari, 2018). The truth-value of any proposition can be estimated as the degree of membership of the corresponding fuzzy relation. Consequently, a fuzzy predicate can be described as the membership function of a fuzzy relation over individual variables' universe of discourse. Each fuzzy predicate signifies a concept in the GAF. For instance, the building damage described in section R322 of the FBC 2020-R can be modeled as a fuzzy variable. These involve small damage, medium damage, and substantial damage. Next, let $z_{i2}$=a fuzzy variable described as $$\left.\begin{array}{ll} \mu_A(u)=0 & 80\% \le u \ge 0 \\ \mu_A(u)=\left(\frac{1}{15}\right)u-\frac{25}{15} & 80\% < u \ge 90\% \\ \mu_A(u)=1 & u > 90\% \end{array}\right\} \quad (16)$$

where $0 < \mu_A(u) \le 1$.

Finally, section R322 of the FBC 2020-Residential is transformed into the following rule:

$R_3$: ∀z (InFloodZone(z)∩Damage(z, $z_{12}$)→(RequiredProvision(z, $z_{11}$))) (17)

Engineering design codes do have quite often such vague terms to describe certain conditions. Table 5 (below) summarizes some of these terms and their transformation using a fuzzy predicate.

TABLE 5

| No | Uncertain building code Terms | Conceptualization |
|---|---|---|
| 1 | The building has Some damage | Fuzzy predicate, $0 \le \mu_A(u) \le 1$ |
| 2 | The building has a good amount of damage | Fuzzy predicate, $0 \le \mu_A(u) \le 1$ |
| 3 | Building damage is extreme | Fuzzy predicate, $0 \le \mu_A(u) \le 1$ |
| 4 | A Substantial amount or a sizable amount | Fuzzy predicate, $0 \le \mu_A(u) \le 1$ |
| 5 | A fair amount or Moderate amount | Fuzzy predicate, $0 \le \mu_A(u) \le 1$ |
| 6 | Large value | Fuzzy predicate, $0 \le \mu_A(u) \le 1$ |
| 7 | Small amount | Fuzzy predicate, $0 \le \mu_A(u) \le 1$ |
| 8 | Very little or a little bit | Fuzzy predicate, $0 \le \mu_A(u) \le 1$ |

The fuzzy predicate may be defined as a relation with arguments, and the arguments may be constants or variable: Rel(u, A), where A is fuzzy set, Rel is a relation, and u is an element in the Universe of discourse U. For instance, "Building X damage is substantial." The fuzzy predicate is given by Damage(Building X, substantial) where "substantial" is fuzzy set, "Damage" is a relation and "Building X" is an individual element.

By integrating land development permit applications and related documents with building information modeling concepts, exemplary methods and systems can be employed to evaluate and check for compliance with such documents with applicable land development codes and regulations. Accordingly, in various embodiments, land development codes and regulations can be transformed into equivalent logic rules by which an input file can be assessed using artificial intelligence and machine learning via one or more artificial neural networks. An exemplary system uses neural NLP techniques and/or deep neural network-style machine learning/Artificial Intelligence. In various embodiments, the framework software can be installed on a central server that can be made available to various local municipalities to provide code compliance review and related services for the land development plans and related documents involving the municipalities and their constituents. In some embodiments, the framework software comprises a plug-in piece of software for an existing computer program. In accordance with the present disclosure, a land development permit application file standard can be established for the development of land development permit applications and computable records of land development code regulations. As such, a rule-based system, implemented via an artificial intelligence system or neural network, can be established to automatically check land development code conformance and other regulations. In various embodiments, the neural network can output prediction confidence data for its compliance review and/or classification of land development plan details. Any inaccurate prediction of code conformance can be fed back to the AI system for improved prediction in the future. To do so, the neural network may use supervised or unsupervised or other learning methods to improve accuracy of land development code conformance review of land development projects.

Figure 7:
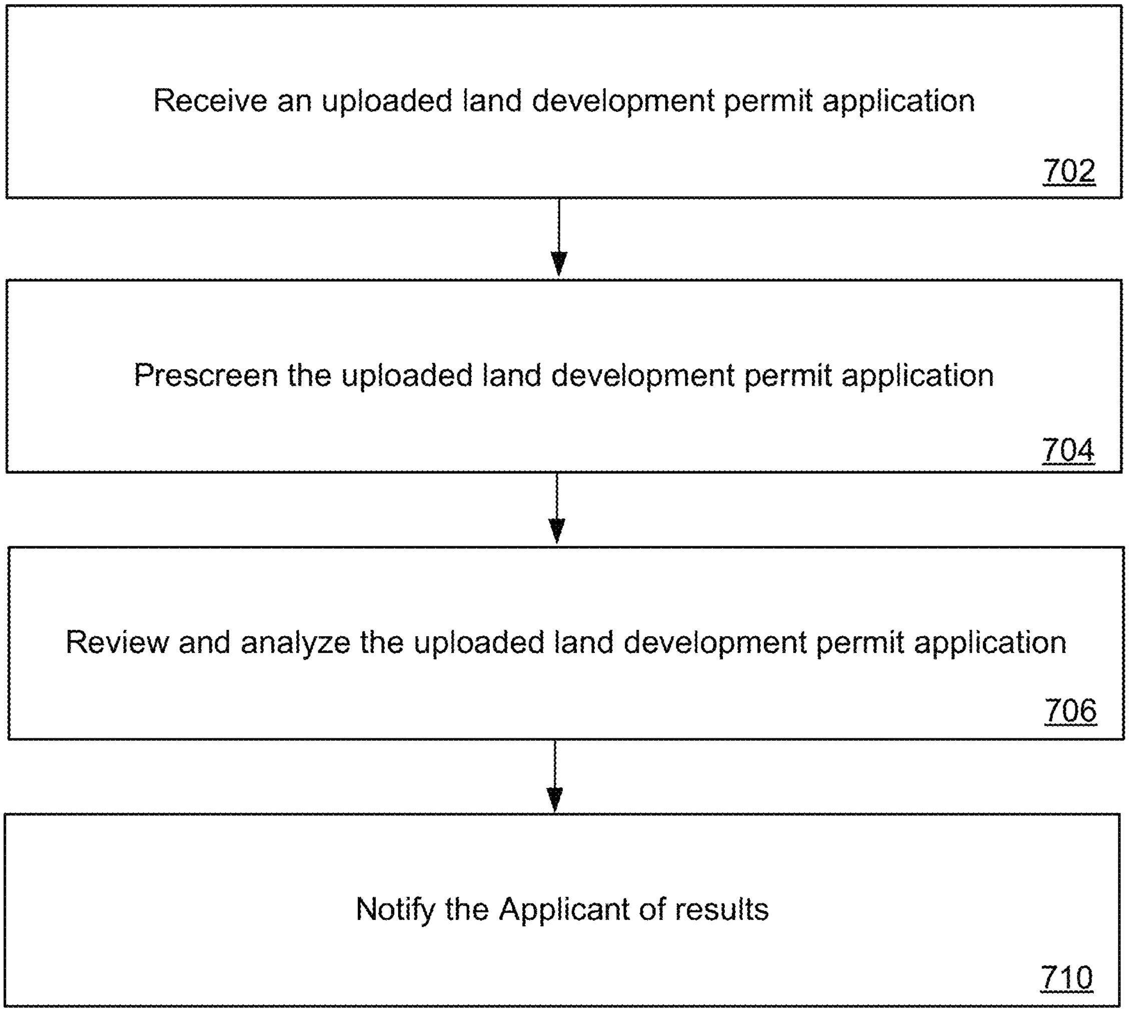
FIG. 7 shows a flowchart of an exemplary land development plan review process in accordance with various embodiments of the present disclosure.

Next, FIG. 7 shows an exemplary land development plan review process, in accordance with various embodiments of the present disclosure. To start this process, an Applicant can upload a land development permit application, in step 702, which can be prescreened, in step 704, to verify that the application is in the correct format, contact information is provided for the Applicant, or to verify other information that does not require detailed analysis or expert analysis of the contents of the application file. After the prescreening review is approved and completed, then in step 706, the land development permit application file can begin to be analyzed via an embodiment of an exemplary automated determination of land development code performance framework of the present disclosure. As part of this analysis, a previously stored version of the land development permit application file may be retrieved and compared against an updated version of the land development application file. Upon completion of the review and analysis, the Applicant may be notified of the results, in step 710, such that corrections may be required and additional information may need to be reviewed or the Applicant may be granted a land development permit if corrections are not required.

The present disclosure provides various systems and methods of automated determination of land development code, ordinances and regulatory compliance checking process. One such method among others comprises receiving, by a computing device, a land development permit application file for a land development site plan, wherein the land development permit application file includes a BIM or CAD or PDF file of the land development site plan; checking, by the computing device, the land development permit application file for land development code, ordinances and regulatory compliance checking with computable files defining applicable land development codes, ordinances and regulations; generating, by the computing device, a land development code, ordinances and regulatory compliance checking report indicating whether the land development permit application file has passed a check for the land development code, ordinances and regulatory conformance; and transmitting, by the computing device, the land development code, ordinances and regulations' conformance report to a client device of an applicant associated with the land development permit application file.

As discussed, the present disclosure also provides systems of automated determination of land development code ordinances and regulations conformance. One such system comprises at least one processor; and memory configured to communicate with the at least one processor, wherein the memory stores instructions that, in response to execution by the at least one processor, cause the at least one processor to perform operations comprising: receiving a land development permit application file, wherein the land development permit application file includes a BIM or CAD or PDF file of a land development site plan; checking the land development permit application file for land development code conformance with computable files defining land development codes, ordinances and regulations; generating a land development code, ordinances and regulations conformance report indicating whether the land development permit application file has passed a check for the land development code, ordinances and regulations conformance; and transmitting the land development code, ordinances and regulations compliance checking or conformance report to a client device of an applicant associated with the land development permit application file.

In one or more aspects, an exemplary system/method may further comprise acquiring land use details from the BIM or CAD or PDF file of the land development site plan, wherein the checking for land development code, ordinances and regulations compliance comprises checking the land use details of the land development site plan for conformance with land use codes, ordinances and regulations as defined with the computable files; retrieving a stored land development code, ordinances and regulations conformance review report of the Applicant for the land development site plan; acquiring zoning details of the land development site plan from the BIM or CAD or PDF file of the land development site plan; wherein the checking for land development code compliance comprises checking the land use details of the land development site plan for conformance with zoning codes, ordinances and/or regulations as defined with the computable files; storing the land development code, ordinances and regulations conformance report to a database of the computing device; and/or transforming or converting, by the computing device, a land development code, ordinance and regulation into a computable record that defines a rule for the land development code, ordinance and regulation.

In one or more aspects of the system/method, the computing device executes a neural network to perform tasks associated with the land development permit review; the neural network outputs prediction confidence data for a land development code, ordinance and regulation conformance review of the land development site plan; the neural network undergoes supervised training to improve accuracy of land development code, ordinances and regulations conformance review of land development site plans; and/or the neural network undergoes unsupervised training to improve accuracy of land development code, ordinances and regulations conformance review of land development site plans.

Figure 8A:
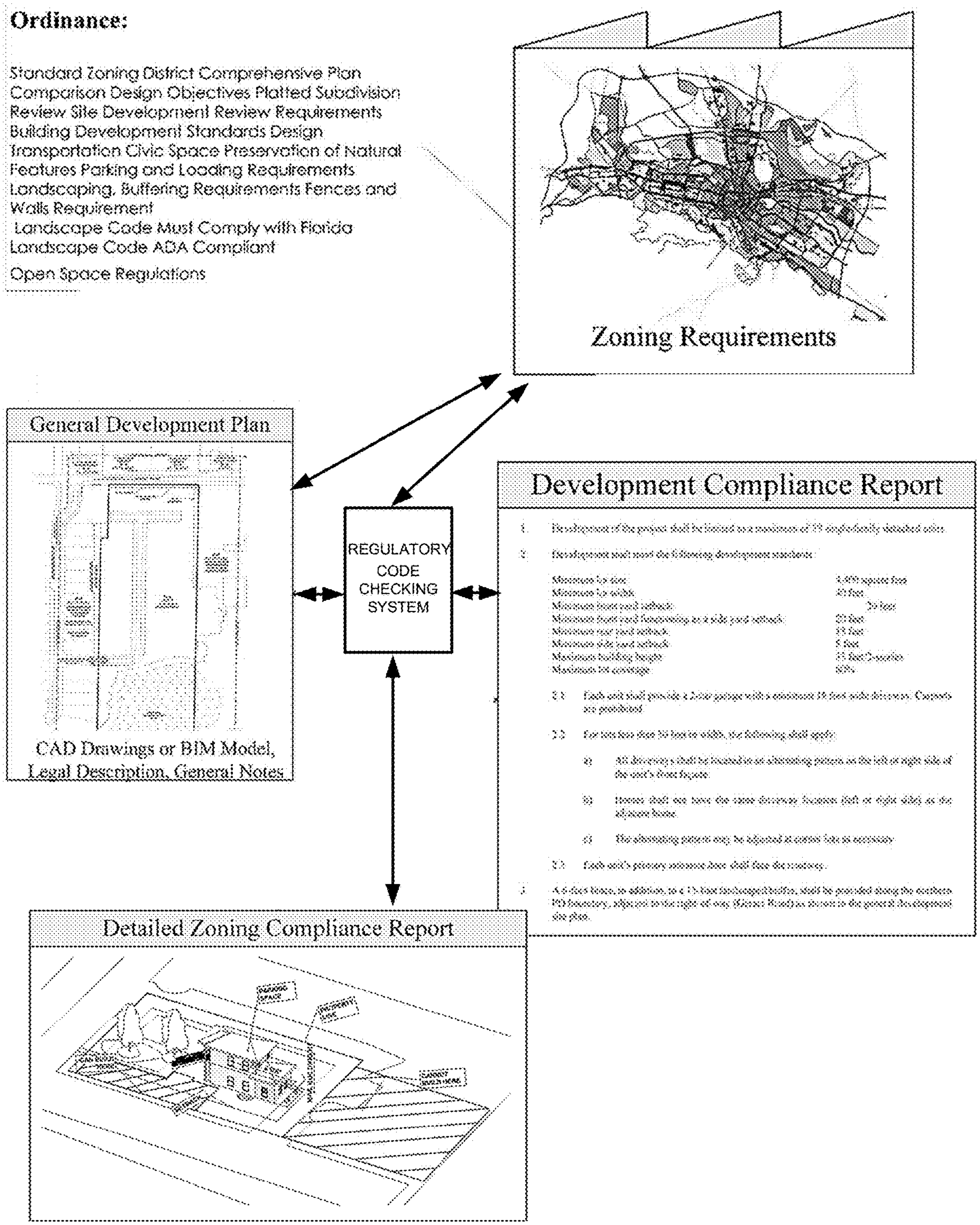
FIG. 8A shows an overview for an exemplary computing system in accordance with embodiments of the present disclosure.
Figure 8B:
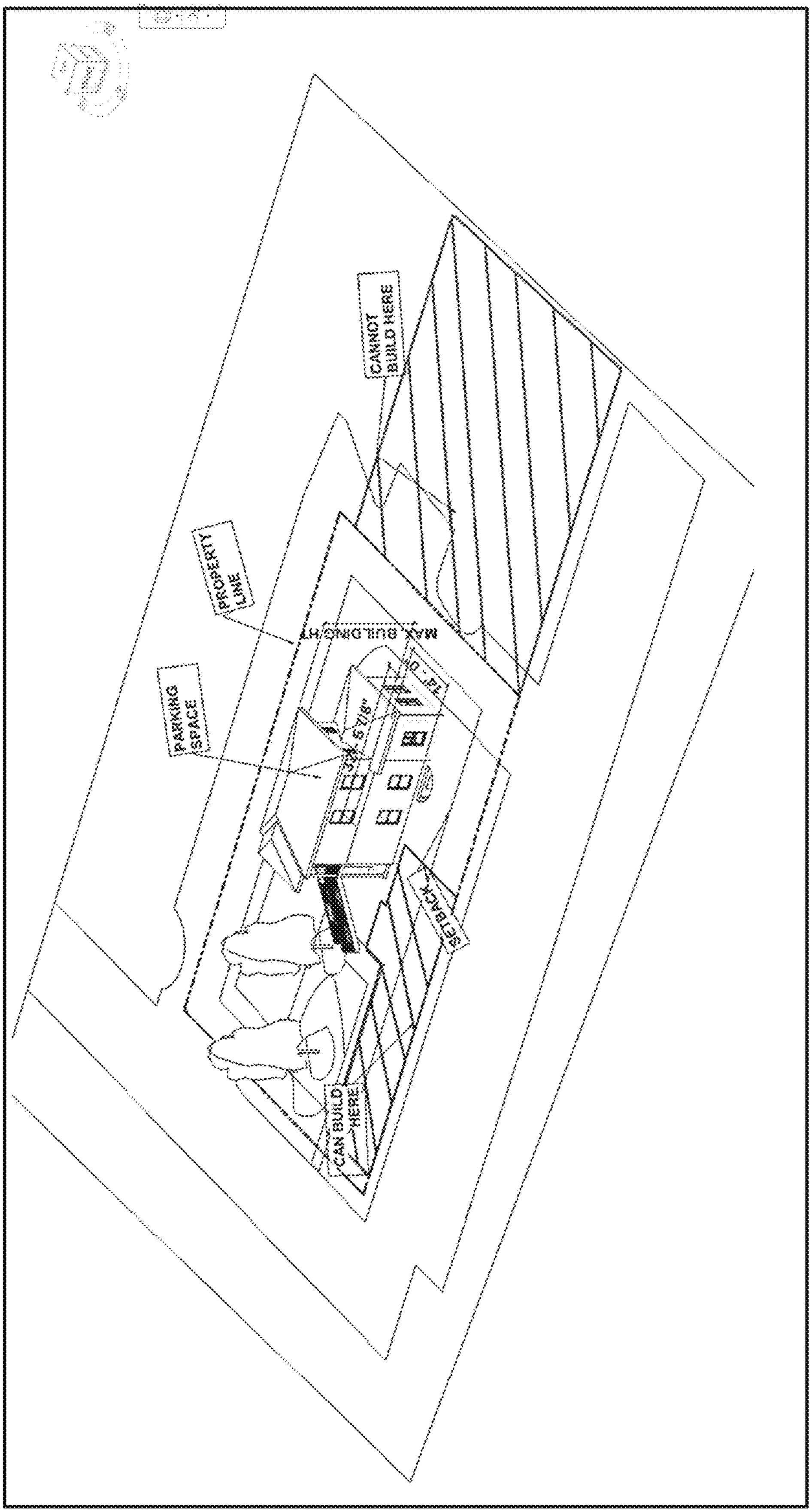
FIG. 8B shows a detailed zoning compliance report of FIG. 8A.

Referring now to FIG. 8A, an overview is provided for an exemplary computing system in accordance with embodiments of the present disclosure. In this illustrative example, the computing system is referred to as a Code, Ordinance and Regulatory Code Checking System. The Regulatory Code, Ordinance and Regulatory Checking System receives as input a land development permit application, which is also referred to as a General Development Plan, in the form of or containing CAD drawings or BIM Model or PDF file in addition to a legal description of a piece of property and general notes associated with the development plan. After receipt of the land development permit application, the Regulatory Code Checking System evaluates or analyzes the plan against computable land development records of zoning code regulations. As such, a rule-based system, implemented via an artificial intelligence system or neural network, can be performed by the Regulatory Code Checking System to automatically check zoning code, ordinance and regulation conformance, as one possible example. In various embodiments, the neural network can output prediction confidence data for its compliance review and/or classification of land development plan details. After analysis of the land development is completed, the Regulatory Code Checking System prepares one or more land development code conformance reports. In the illustrative example of FIG. 8A, a detailed zoning compliance report and a development compliance report are generated. For the development compliance report, areas where the land development plan conforms with the applicable codes, ordinances and regulations are listed and/or areas where the land development plan do not conform with the applicable codes, ordinances and regulations are listed. For the detailed report (also shown in FIG. 8B), the foregoing information may be provided in addition to a map showing a drawing of the proposed development superimposed on a GIS (geographic information system) map of the geographic area having the applicable zoning conditions illustrated. Accordingly, in various embodiments, a CAD drawing or BIM model or PDF file can be processed and formatted so that it can be accurately positioned on a GIS map. In one such embodiment, processes can be executed by the Regulatory Code Checking System or other computing device.

Additionally, in various embodiments, imaging data of the piece of property under consideration for the land development site plan may be captured using an unmanned aerial vehicle or drone to aid in identification of and/or confirmation of information provided in the land development permit application. Imaging data can include photographs, videos, thermal images, LIDAR images of the site. In accordance with various embodiments, artificial intelligence (AI) algorithms can be implemented by the Regulatory Code Checking System to identify the site's main features and compare them with corresponding features submitted in a CAD or BIM or PDF file for validation. Accordingly, imaging data can be stored in one or more databases 114.

Figure 9:
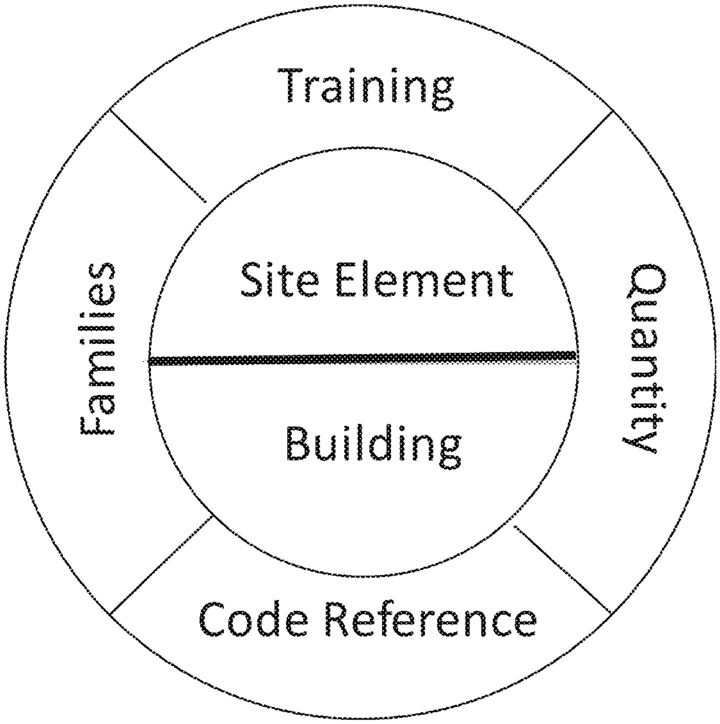
FIG. 9 shows an exemplary interface for an exemplary computing system in accordance with embodiments of the present disclosure.

In some embodiments, the framework software comprises a plug-in piece of software for an existing computer program. In some embodiments, the plug-in software installed as an external program (sometimes referred to as "addin") allows the user of the software program to (a) perform real time code checking and/or compliance of individual building and site elements or components as the site design model is being developed/modeled in the software platform; (b) perform real time code checking and/or compliance of whole site as the site design model is being developed/modeled in the software platform; (c) perform real time display of relevant codes for individual site elements or components as the site design model is being developed/modeled in the software platform; (d) perform real time display of relevant codes for the whole site as the site design model is being developed/modeled in the software platform; and (d) perform real time display and interactive training materials or site elements or components or whole site as the site design model is being developed/modeled in the software platform. In some embodiments, the plug-in software shows a semi-transparent interface embedded with buttons for enabling the above listed actions, as illustrated in FIG. 9G 9. This interface is moveable (rotate, move, translate, scale) and can be pinned to the software program. In some embodiments, the plug-in software can run in the cloud-computing environment or in a desktop application.

Figure 11:
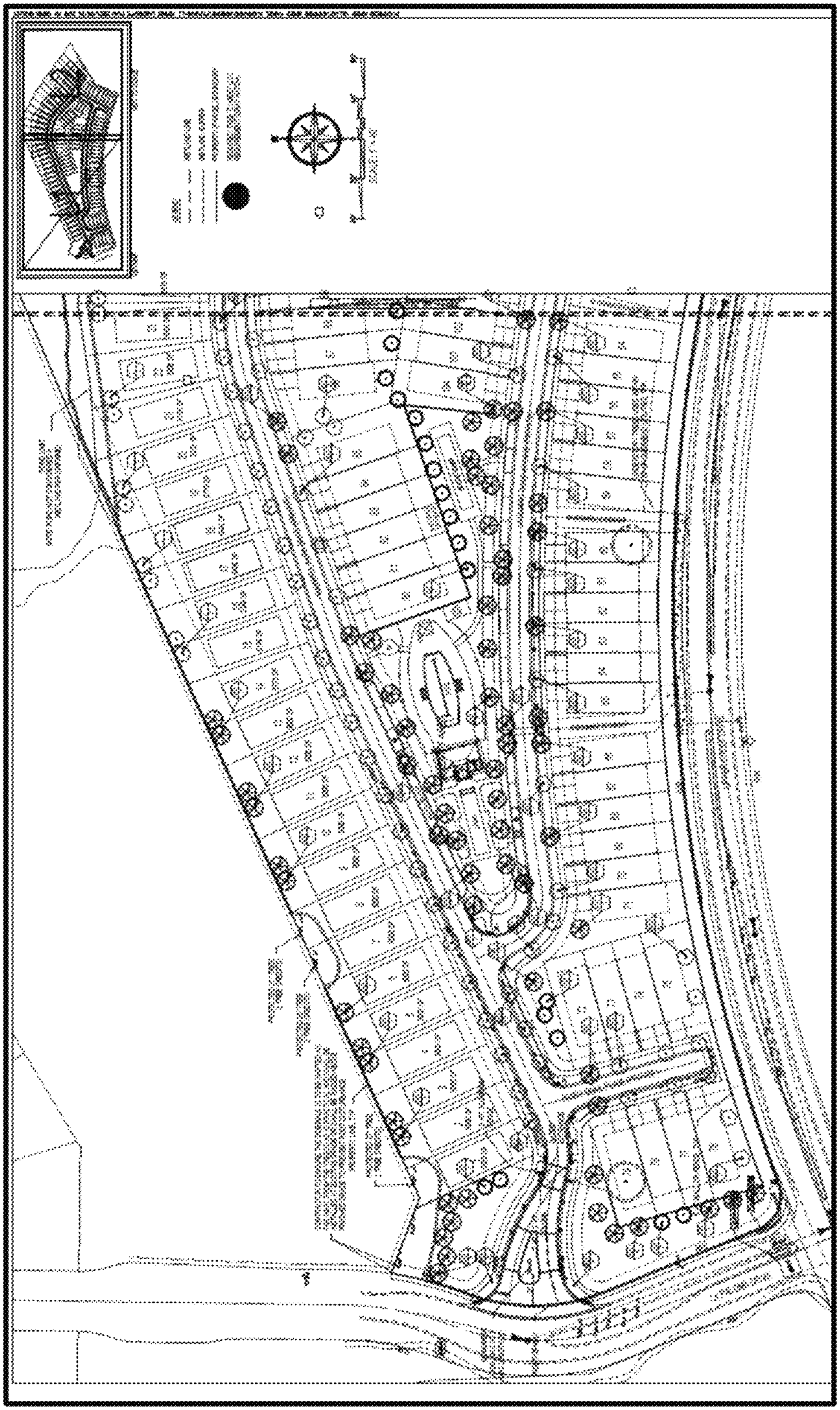
FIG. 11 shows an exemplary CAD drawing that can be used with a land development permit application in accordance with embodiments of the present disclosure.

FIGS. 10A-1, 10A-2, 10B, and 10C show exemplary reports of application items that have been noted or flagged for not conforming with or violating applicable zone regulations or indicating errant items in the application file. Namely, FIGS. 10A-1 and 10A-2 show land use flagged items, FIG. 10B shows transportation flagged items, and FIG. 10C shows flagged general notes items. Accordingly, individual reports can be output for different parts of a land development permit application asides zoning, such as those involving transportation infrastructures, utilities, parking, landscaping, drainage, sanitation, street lights, water lines, power lines, other infrastructure elements, etc. An exemplary CAD drawing that can be used with a land development permit application is provided in FIG. 11. Here, the CAD file contains a landscape design that can be examined against the relevant Landscape codes, ordinances and regulations for the landscape review. For instance, this includes determining the percentage of lawn to the impervious areas, number, types, and locations of shrubs and trees. The same approach can also be implemented for drainage and sanitary sewers, utility lines, culvert, roads, bridges, erosion controls, wetland controls, and other infrastructure elements.

In accordance with embodiments of the present disclosure, extraction of information from a land development permit can be developed based on specific site regulations per the zoning code. The site address can be automatically compared to the zoning code and regulations for the specific city/county with which the site address is associated. An exemplary algorithm takes the government entity's codes and processes them through computational algorithms to provide the client with the answers to their site development plan. Project land use Information is vital for a developer to show the government entity that they know the current code requirements and are willing to comply with them. After generating the attribute tables and understanding them, an exemplary algorithm can continue to show site planning possibilities through related algorithms, such as the site summary analysis, transportation analysis, and more.

In an exemplary transportation analysis process, clients can submit a land development plan and an exemplary algorithm reviews the plan, including AutoCAD or Revit files that accompany the plan, and generates notes indicating what needs to be addressed or fixed and the reasons why the item(s) need correcting, all according to the applicable government entity standards and regulations.

As such, an exemplary system provides developers the opportunity to get their plans reviewed prior to submitting them to the government entity. This enhances the developers' chances of getting their site plan approval in the first review cycle. In an exemplary implementation, the transportation review involves a review of over 144 local transportation requirements to improve a site. The transportation review is normally reviewed by multiple professionals in a government entity; these professionals could have different opinions with different approval conditions.

An exemplary system removes all biases and references only to the code-specific requirements. The specific code requirements allow the developer to look at what should be fixed and why it should be resolved. After reviewing a submitted pdf, AutoCAD, or Revit file, an exemplary algorithm will give the client "Flag Notes." The "Flag Notes" are created based on what corrections must be made on the submitted pdf, AutoCAD, or Revit file and why they need to be corrected. Flag Notes can include a report showing you what specific sections in a site plan must be corrected based on the particular government entity code requirements. The Flag Notes can have a summary for every transportation attribute flagged and show the client any related code links to show the specific why the site plan must be corrected prior to approval.

In an exemplary landscape review process, an exemplary algorithm ensures that client site plans comply with the applicable landscaping codes and standards, such as those related to Native Shade Trees, Native Accent Trees, Native Palm Species, Native Shrubs, Native Groundcover Species, Native Grass Species, Mulching, ROW Buffer, Interior Parking Guidelines, Street Trees, Buffers and Screening Requirements, Open Storage, Solid Waste Storage, Stormwater Evaluation, and/or Wheel Stops and Curbs.

After an exemplary system reviews the pdf. CAD, or Revit file attributes of a landscaping plan, an exemplary algorithm can present results on what is needed to be fixed and why the item(s) need to be corrected before submitting them to a government entity, thereby reducing the amount of time a client would have to go back and forth to the city prior to the approval of their site plan. The results ("Flag Notes") can provide the client with the information needed to adjust the applicable file in order to make sure that the site plan is up to code prior to submitting it to a government entity. Thus, Flag Notes are one way that an exemplary system can instruct a client on which code they are not complying with and how to correct this error. Flag Notes can show precisely how developers can adjust their plans to the approval requirements and give developers the specific municide links of where to refer to the code for that particular code requirement giving the client access to the specific landscape code, zoning code, or comprehensive plan links to understand the particular area that needs to be fixed and why it must be corrected prior to submission.

Given that government entities have their own specific local landscaping code and land development code guidelines, an exemplary system can take all the local codes, states' landscaping codes, and landscaping requirements to review a site plan and make sure that the plan is ready for submittal according to those specific code requirements.

In various embodiments, an exemplary landscaping review process examines the proposed pervious structures and the placement of each species, where the applicable define distances of location and placement of the landscaping standards for the specific site. In an exemplary implementation, disclosed algorithms process thousands of lines of codes to make sure that the client has the support needed to show compliance with all government code requirements for the landscaping approval in addition to removing subjective biases from the landscaping review process and solely referring to the specific code requirements for that zone. In brief, there are many different land development possibilities with any site, and knowing what the site is composed of will help define how the site can be retrofitted. In an exemplary site summary review process, analytical review report is generated that informs the client what they can or cannot build with the specific parcel's current zoning and future land use specifications.

Knowing how many units could possibly be built on a property is vital for the buyer of any property. An exemplary site summary algorithm allows users to compare the local income and homestead/non-homestead properties to provide information about the estimated selling price of a single-family home. Furthermore, it enables users to review the property and analyze the possibilities of developing single-family homes, multifamily homes, duplexes, condos, apartments, etc. An exemplary algorithm has density calculations using trained AI to analyze the property and inform the client within seconds, what they can build on the property, how high they can build, minimum lot requirements, and more.

Informative decision-making in investing in vacant land can help the land buyers understand property analytics. The site summary can tell the buyer or investor precisely what the land is composed of, such as soil types and the current species on the land. Identifying what the land is composed of is vital to site plan development, showing the buyer what they can currently use on the property and what they will need to buy for landscaping requirements conserving the site's current state as much as possible and enhancing the existing site features through the site plan design suggestions.

An exemplary site summary algorithm can also inform the client about the local demographics of the area, such as the local languages spoken, income per household, spending categories per household, families with disability ratings, and more. For example, demographic analysis can inform who the neighborhood is and who the developer would have as potential clients, thereby creating a summarized plan on a possible approach for site development for any specific address point.

In an exemplary implementation, the site summary analysis includes a location map of the site and a local neighborhood report, which can include data analyzing the local neighborhood to show the developer rent to own ratios, or the community amenities such as local restaurants. An exemplary system can collect this information to show exactly what the community surrounding a site is like by using a buffer zone analysis (e.g., 0.5 mi buffer zone, 1 mile buffer, 3 mile, and 5 mile buffer zones.

In an exemplary implementation, the site summary analysis includes a zoning regulations report, which can include site features and GIS maps such as, but not limited to, Location Map, Bodies of Water Map, Wetland Location Map, Elevations, Contours, and Depression Map, FEMA Flood Zone (Federal Emergency Management Agency) Map, and/or Soil Map. Thus, the zoning regulations report shows the zoning regulations that apply to a specific area and allow a developer to understand the buildable possibilities for that specific area or zone, along with minimum lot requirements. For example, the wetland location map shows wetland zones that are classified as environmentally sensitive areas that are near a site. If a wetland area is classified as a conservation area, then a certain setback may be required (e.g., 30 feet). Correspondingly, if the wetland area is classified as a preservation area, then a larger setback may be required (e.g., 50 feet), in accordance with applicable land use codes or regulations. When building near wetlands sites, land development plan will generally need to comply with applicable wetlands regulations and will need to show the protection of the wildlife habitat (e.g., plan can show that no roadway is to be built near the wetland habitat).

In an exemplary implementation, the site summary analysis includes an elevations map showing buildable opportunities with the elevation's sources shown. In an exemplary implementation, the site summary analysis includes a FEMA Flood Zone map showing possibilities for flooding through heavy rains or poor drainage at a site. The flood map shows you specifically what your flood zone risk is: high-risk, low-risk, or moderate risk.

In an exemplary implementation, the site summary analysis includes a sample soil survey for a site and the related goals as prescribed by applicable coding and regulations. As an example, the goals described in the coding regulations may involve the minimization of impact to land alteration in unnecessary removal of existing vegetation or alteration of the topographic land surface features. Correspondingly, the site summary analysis may recommend that land development of a site there should be sodded, plugged, sprigged, seeded, or covered vegetation in ordinance with the applicable codes and regulations.

In an exemplary implementation, the site summary analysis includes a landscaping report that specify landscaping requirements. For example, design standards according to applicable development codes may be related to requirements for energy conservation, water conservation and quality, vehicular and pedestrian safety, aesthetically pleasing and functional living environment, transitional interface between development and uncomplimentary and/or incompatible land uses, compliance with future land uses, etc.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising:

employing partial encoding using fuzzy logic to transform, by at least one hardware processor, textual provisions and guidelines of land development codes and regulations into a computable digital representation of the land development codes and regulations by translating a semantic structure of each code and regulation into object rules or parametric models using a formal language, classifying and encoding objective data specified in the land development codes and regulations using feature extraction in the object rules or parametric models, and classifying and encoding subjective data specified in the object rules using fuzzy logic and natural language processing in the object rules or parametric models;

acquiring, by the at least one hardware processor, from a land development design document in a building information model (BIM) digital format, a plurality of objects and a plurality of attributes describing the plurality of objects, wherein the plurality of attributes include at least a spatial relationship of a land development design and one or more details on zoning, landscaping, drainage, sanitation, and wetland controls with respect to the land development design; and performing, by the at least one hardware processor, real time code checking and/or compliance of individual building elements of the land development design document in the BIM digital format as the land development design document is being developed by:

graphically displaying, by the at least one hardware processor, a graphical user interface of a site design model platform, wherein the graphical user interface is embedded with a plurality of graphic buttons for initiating a plurality of actions of code conformance checking of the land development design document;

upon receiving a selection of a first one of the plurality of graphic buttons embedded in the graphical user interface of the site design model platform, performing, using the at least one hardware processor, design model validation, wherein the design model validation comprises approving a format of the land development design document;

performing, via one or more design checking modules and an artificial neural network by the at least one hardware processor, code conformance checking of the land development design document using the computable digital representation of the land development codes and regulations, wherein code conformance checking comprises checking land use details of the land development design document for conformance with at least zoning codes and regulations, landscaping codes and regulations, drainage codes and regulations, sanitation codes and regulations, and wetland control codes and regulations, as defined by the computable digital representation of the land development codes and regulations;

upon receiving a selection of a second one of the plurality of graphic buttons embedded in the graphical user interface of the site design model platform, performing, using the at least one hardware processor, compliance reporting based on input provided from the design checking modules, wherein the compliance reporting includes a prediction confidence data for the code conformance checking performed by the one or more design checking modules;

receiving, by the at least one hardware processor, inaccurate prediction of code conformance data; and retraining, the one or more design checking modules and the artificial neural network using the inaccurate prediction of code conformance data to improve prediction accuracy.

2. The method of claim 1, wherein the design checking modules are configured to check all land development code, ordinance, and regulatory provisions per local, state, national or international requirements.

3. The method of claim 1, wherein the land development codes and regulations are transformed using a Transformation Logic Algorithm (TLA), neural Natural Language Processing (NLP) techniques, or artificial intelligence.

4. The method of claim 1, wherein the compliance reporting comprises superimposing a CAD drawing or BIM model or PDF file of a proposed development of a piece of property on a GIS map of a geographic area having applicable zoning conditions illustrated.

5. The method of claim 1, wherein the land development design document comprises a land development permit application file.

6. The method of claim 1, wherein the land development design document comprises a land development site plan.

7. The method of claim 6, further comprising verifying the land development design document by acquiring imaging data of a property under consideration for the land development site plan using an unmanned aerial vehicle and confirming information provided in the land development site plan with the imaging data.

8. The method of claim 7, wherein the imaging data comprises LIDAR images of the property captured by the unmanned aerial vehicle.

9. A system comprising:

at least one hardware processor; and one or more software modules that are configured to, when executed by the at least one hardware processor:

employ partial encoding using fuzzy logic to transform and generate textual provisions and guidelines of land development codes and regulations into a computable digital representation of the land development codes and regulations by translating a semantic structure of each code and regulation into object rules or parametric models using a formal language, classifying and encoding objective data specified in the land development codes and regulations using feature extraction in the object rules or parametric models, and classifying and encoding subjective data specified in the object rules using fuzzy logic and neural Natural Language Processing (NLP) in the object rules or parametric models;

acquire, from a land development design document in a building information model (BIM) digital format, a plurality of objects and a plurality of attributes describing the plurality of objects, wherein the plurality of attributes include at least a spatial relationship of a land development design and one or more details on zoning, landscaping, drainage, sanitation, and wetland controls with respect to the land development design; and perform real time code checking and/or compliance of individual building elements of the land development design document in the BIM digital format as the land development design document is being developed by:

graphically displaying a graphical user interface of a site design model platform, wherein the graphical user interface is embedded with a plurality of graphic buttons for initiating a plurality of actions of code conformance checking of the land development design document;

upon receiving a selection of a first one of the plurality of graphic buttons, performing design model validation, wherein the design model validation comprises approving a format of the land development design document;

performing, via with an artificial neural network, code checking, wherein exchange model code conformance checking of the land development design document comprises using the computable digital representation of the land development codes and regulations, wherein code conformance checking comprises checking land use details of the land development design document for conformance with at least zoning codes and regulations, landscaping codes and regulations, drainage codes and regulations, sanitation codes and regulations, and wetland control codes and regulations, as defined by the computable digital representation of the land development codes and regulations;

upon receiving a selection of a second one of the plurality of graphic buttons embedded in the graphical user interface of the site design model platform, performing compliance reporting based on input provided from the software modules, wherein the compliance reporting includes a prediction confidence data for the code conformance checking performed by the software modules;

receiving inaccurate prediction of code conformance data; and retraining the software modules and the artificial neural network using the inaccurate prediction of code conformance data to improve prediction accuracy.

10. The system of claim 9, wherein the land development codes and regulations are transformed using a Transformation Logic Algorithm (TLA), neural Natural Language Processing (NLP) techniques, or artificial intelligence.

11. The system of claim 9, wherein the compliance reporting comprises superimposing a CAD drawing of a proposed development of a piece of property on a GIS map of a geographic area having applicable zoning conditions illustrated.

12. The system of claim 9, wherein the land development design document comprises a land development permit application file.

13. The system of claim 9, wherein the land development design document comprises a land development site plan.

14. The system of claim 13, wherein the one or more software modules are further configured to verify the land development design document by acquiring imaging data of a property under consideration for the land development site plan using an unmanned aerial vehicle and confirming information provided in the land development site plan with the imaging data.

15. The system of claim 14, wherein the imaging data comprises LIDAR images of the property captured by the unmanned aerial vehicle.

16. A non-transitory computer-readable medium having instructions stored therein, wherein the instructions, when executed by a processor, cause the processor to:

employ partial encoding using fuzzy logic to transform and generate textual provisions and guidelines of land development codes and regulations into a computable digital representation of the land development codes and regulations by translating a semantic structure of each code and regulation into object rules or parametric models using a formal language, classifying and encoding objective data specified in the land development codes and regulations is encoded using feature extraction in the object rules or parametric models, and classifying and encoding subjective data specified in the object rules using fuzzy logic and neural Natural Language Processing (NLP) in the object rules or parametric models;

acquire from a land development design document in a building information model (BIM) digital format, a plurality of objects and a plurality of attributes describing the plurality of objects, wherein the plurality of attributes include at least a spatial relationship of a land development design and one or more details on zoning, landscaping, drainage, sanitation, and wetland controls with respect to the land development design; and perform real time code checking and/or compliance of individual building elements of the land development design document in the BIM digital format as the land development design document is being developed by:

graphically displaying a graphical user interface of a site design model platform, wherein the graphical user interface is embedded with a plurality of graphic buttons for initiating a plurality of actions of code conformance checking of the land development design document;

upon receiving a selection of a first one of the plurality of graphic buttons, performing design model validation, wherein the design model validation comprises approving a format of the land development design document;

performing, via one or more design checking modules and an artificial neural network, code conformance checking of the land development design document using the computable digital representation of the land development codes and regulations, wherein code conformance checking comprises checking land use details of the land development design document for conformance with at least zoning codes and regulations, landscaping codes and regulations, drainage codes and regulations, sanitation codes and regulations, and wetland control codes and regulations, as defined by the computable digital representation of the land development codes and regulations;

upon receiving a selection of a second one of the plurality of graphic buttons embedded in the graphical user interface of the site design model platform, performing compliance reporting based on input provided from the design checking modules, wherein the compliance reporting includes a prediction confidence data for the code conformance checking performed by the one or more design checking modules;

receiving inaccurate prediction of code conformance data; and retraining the one or more design checking modules and the artificial neural network using the inaccurate prediction of code conformance data to improve prediction accuracy.

17. The non-transitory computer-readable medium of claim 16, wherein the compliance reporting comprises superimposing a CAD drawing or BIM model or PDF file of a proposed development of a piece of property on a GIS map of a geographic area having applicable zoning conditions illustrated.

18. The non-transitory computer-readable medium of claim 16, wherein the land development codes and regulations are transformed using a Transformation Logic Algorithm (TLA), neural Natural Language Processing (NLP) techniques, or artificial intelligence, wherein the design checking modules are configured to check land development code, ordinance, and regulatory provisions and any regulations per local, state, national or international requirements.

19. The non-transitory computer-readable medium of claim 16, wherein the land development design document comprises a land development permit application file or a land development site plan.

20. The non-transitory computer-readable medium of claim 16, wherein the land development design document comprises a land development site plan, wherein the one or more design checking modules are configured to verify the land development design document by acquiring imaging data of a property under consideration for the land development site plan using an unmanned aerial vehicle and confirming information provided in the land development site plan with the imaging data.

* * * * *